INVENTOR.
KENNETH H. BECK
BY Arthur H. Swanson
ATTORNEY.

2,907,887

ELECTRICAL APPARATUS

Kenneth H. Beck, Newtown, Pa., assignor to Minneapolis-Honeywell Regulator Company, Minneapolis, Minn., a corporation of Delaware Application December 15, 1955, Serial No. 553,290

8 Claims. (Cl. 250—214)

A general object of the present invention is to provide a new and improved modulating circuit. More specifically, the present invention is concerned with a circuit for modulating a carrier frequency signal in accordance with light level variations.

Another specific object of the present invention is to provide a new and improved modulating circuit employing a photodiode as the light sensitive element.

Circuits for accomplishing amplitude modulation of a carrier in accordance with light level variations are particularly adapted for use in facsimile scanning systems. In such a system, light generally is reflected from a moving copy on to a photosensitive element. The amplitude of the reflected light varies with the changing reflectance of the copy.

One method of accomplishing the modulation of the carrier, is to apply the carrier directly to the filament of an incandescent lamp employed as the light source. Since total modulation of the light source is not accomplished, however, the unmodulated light component will produce a component in the output of the photodetector at the information frequency in addition to the component at the carrier frequency. The problem of separating the two components of the photodetector output is a relatively simple matter if there is a reasonable frequency difference between the carrier and the highest information signal frequency. Because of the rapidly decreasing modulation efficiency of incandescent lamps with frequency, however, the frequency of the carrier must be kept relatively low, increasing the problem of separating the carrier and information signals. Gas discharge tubes may be modulated at high frequencies but spectral response characteristics of currently available photodiodes are not well suited for use with such light sources.

Accordingly, another specific object of the present invention is to provide a new and improved circuit for modulating a carrier frequency signal in accordance with light level variations employing an unmodulated light source.

Still another object of the present invention is to provide a full wave photodiode modulator thereby avoiding the severe harmonic distortion produced by half wave modulators.

A still further object of the present invention is to provide a new and improved full wave photodiode modulator incorporating means for compensating for the effects of photodiode dark current or thermally produced output current.

The various features of novelty which characterize this invention are pointed out with particularity in the claims annexed to and forming a part of this specification. For a better understanding of the invention, its advantages, and the specific objects attained with its use, reference should be had to the accompanying drawings and descriptive matter in which are illustrated and described the preferred embodiments of this invention.

Figure 1:
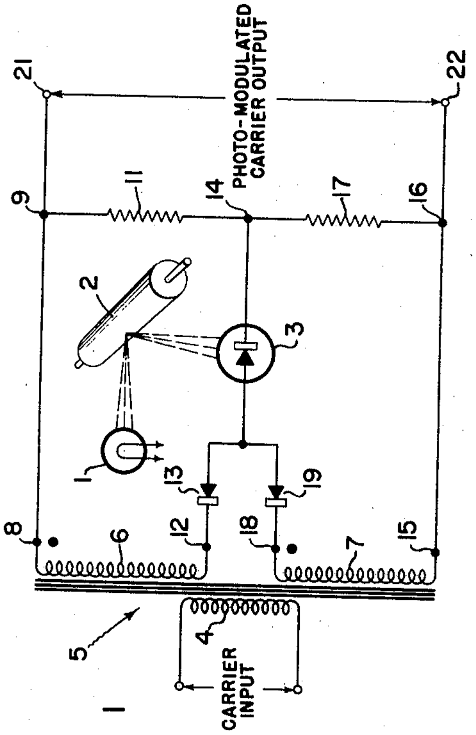
Fig. 1 is a circuit diagram of the basic full wave modulator circuit of the present invention.

Referring now to Fig. 1, the numeral 1 represents an unmodulated light source in a facsimile scanning system. The light source 1 is positioned so as to reflect light from copy on a drum 2 onto a photosensitive diode 3. The carrier frequency signal to be modulated is applied to a primary winding 4 of a transformer 5 having a pair of secondary windings 6 and 7. The end terminal 8 of the secondary winding 6 is connected to an end terminal 9 of a load resistor 11. An end terminal 12 of the secondary winding 6 is connected through the diode 13 and the photodiode 3 to the other end terminal 14 of the resistor 11. In a similar manner, an end terminal 15 of the secondary winding 7 is connected to an end terminal 16 of a load resistor 17. An end terminal 18 of the secondary winding 7 is connected by means of a diode 19 and the photodiode 3 to the other end terminal of the resistor 17 which is connected to the end terminal 14 of the load resistor 11. The load resistors 11 and 17 are of equal magnitude and the output of the modulating circuit is taken across the series connected resistors 11 and 17 by means of a pair of output terminals 21 and 22.

In the operation of the circuit of Fig. 1, a carrier frequency signal which it is desired to modulate in accordance with light level variations is applied to the transformer primary 4. The diodes 13 and 19 are switching diodes operative to prevent current flow through the load 11 during one half cycle of the carrier frequency signal and through the load 17 on the next half cycle of the carrier frequency signal. The transformer secondary winding sections 6 and 7 are wound in such a manner as to have the instantaneous polarities indicated by the polarity marks. Thus, during the first half cycle of the carrier frequency signal, when the end terminal 8 of the secondary winding 6 is positive with respect to the end terminal 12, current will flow from the end terminal 8 through the load resistor 11, through the photodiode 3 is accordance with the amount of light incident thereon and the diode dark current characteristics, and through the diode 13 to the end terminal 12 of the secondary winding section 6. During that same half cycle, the end terminal 18 of the secondary winding 7 will be positive with respect to the end terminal 15 but no current is permitted to flow through the load resistor 17 because of the action of the switching diode 19.

Figure 3:
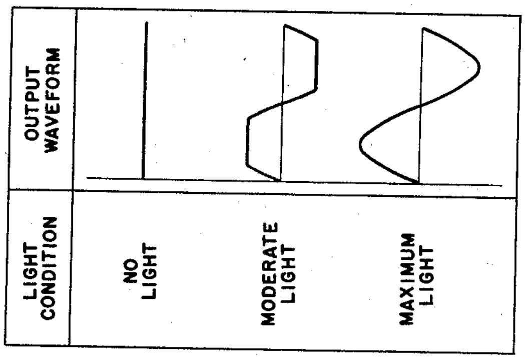
Fig. 3 is a chart showing the output wave forms of the present invention for various conditions of light input.

During the next half cycle of the carrier frequency voltage, however, the end terminal 15 of the secondary winding 7 will be positive with respect to the end terminal 18 and current will flow from the end terminal 15, through the load resistor 17, through the photodiode 3 in accordance with the amount of light incident thereon and the diode dark current characteritsics, and through the diode 19 to the end terminal 18 of the secondary winding 7. During this same half cycle, no current will flow through the load resistor 11 due to the action of the diode 13. Accordingly, the output of the circuit of Fig. 1 is a full wave carrier modulated in accordance with the amount of light incident upon the photodiode 3 and the diode dark current characteristics. Fig. 3 indicates this output for three conditions of light neglecting the dark current flow in the photodiode 11 which produces a small output signal in the absence of any light.

The full wave output of Fig. 1 has a minimum of even order distortion terms thus simplifying filter requirements in applications requiring the elimination of carrier distortion. This type of output is also desirable where high light modulation frequencies are encountered so that prevention of side band attenuation demands careful control of filter band-pass characteristics. Although the output of the circuit of Fig. 1 provides full wave carrier modulation in accordance with the light incident on the photodiode 3, that output is also modulated in accordance with the dark current or thermally produced current in the diode 3. Thus, the need arises for a full wave photodiode modulator wherein compensation is provided for photodiode dark current.

Figure 2:
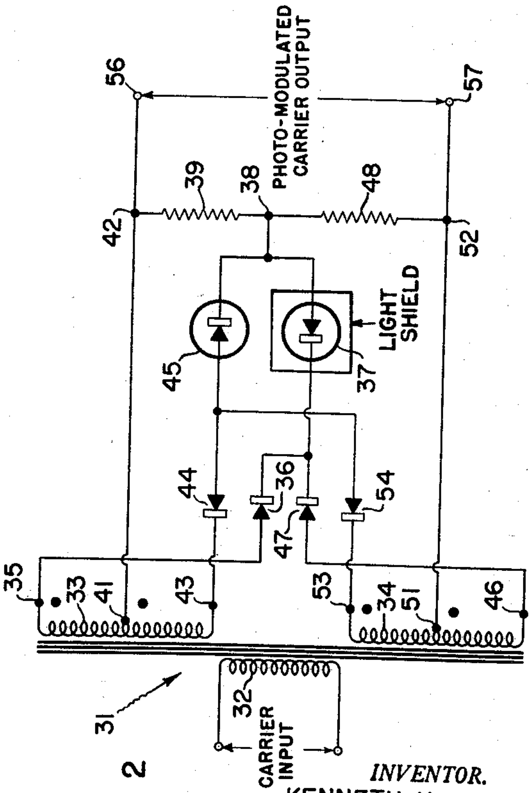
Fig. 2 is a circuit diagram of the full wave modulator of the present invention with dark current compensation.

Referring now to Fig. 2, there is shown a full wave photodiode modulator capable of providing dark current compensation. For simplicity, the light source and copy drum have not been shown. The numeral 31 indicates a transformer having a primary winding 32 and a pair of centre tapped secondary windings 33 and 34. An end terminal 35 of the secondary winding 33 is connected through the diode 36 and the photodiode 37 to an end terminal 38 of a load resistor 39. A center tap 41 of the secondary winding 33 is connected to the other end terminal 42 of the load resistsor 39. The other end terminal 43 of the secondary winding 33 is connected through a diode 44 and the photodiode 45 to the end terminal 38 of the load resistor 39. In a similar manner, an end terminal 46 of the secondary winding 34 is connected through a diode 47 and the photodiode 37 to an end terminal of a load resistor 48 connected to the end terminal 38 of the load resistor 39. A center tap 51 of the secondary winding 34 is connected to the other end terminal 52 of the load resistor 48. The other end terminal 53 of the secondary winding 34 is connected to a diode 47 and the photodiode 45 to the other end terminal of the load resistor 48. The output of the circuit of Fig. 2 is taken between the output terminals 56 and 57 connected to the end terminals of the series connected resistors 39 and 48.

In considering the operation of Fig. 2, it should be understood that the load resistors 39 and 48 have equal magnitudes and that the photodiodes 45 and 37 have been selected to have matched dark current characteristics. The photodiode 45 is subject to light reflected from the copy, not shown, and the photodiode 37 is shielded from all light. It should be noted therefore, that the diode 37 can be any type of diode having similar dark current characteristics and need not necessarily be a photodiode. Like the circuit of Fig. 1, the circuit of Fig. 2 provides a full wave photomodulated carrier output.

The operation of this circuit can be best understood by considering it as comprising two circuits each operative to supply a signal to the output during one half cycle of the carrier frequency signal. The photodiodes 45 and 37 are common to both circuits. The first of these two circuits comprises the transformer secondary winding 33, the load resistor 39, the photodiodes 45 and 37, and the switching diodes 44 and 36. The second of these two circuits comprises the secondary winding 34, the load resistor 48, the photodiodes 45 and 37, and the switching diodes 47 and 54. The transformer secondary windings 33 and 34 are wound in such a manner as to produce the instantaneous polarities indicated by the polarity marks.

If during the first half cycle of the carrier frequency voltage, the end terminal 35 of the transformer secondary winding 33 is positive with respect to the center tap 41, current will flow from the end terminal 35 through the diode 36, the compensating photodiode 37 in accordance with the diode dark current characteristics, and through the load resistor 39 to the center tap 41. During that same half cycle, current will flow from the center tap 41 through the load resistor 39, through the photodiode 45 in accordance with the light incident thereon and the diode dark current characteristics, and the diode 44 to the end terminal 43 of the secondary winding 33. Thus, the current through the compensating diode 37 will be subtracted from the current through the photodiode 45 in the load resistor 39 providing dark current compensation during the first half cycle of the line of the carrier voltage under consideration. In this same half cycle, no current will flow in the second circuit due to the switching action of the diodes 47 and 54.

During the next half cycle of the carrier frequency voltage, however, the end terminal 46 of the secondary winding 34 will be positive with respect to the center tap 51, and current will flow from the end terminal 46 through the diode 47, the compensating diode 37 in accordance with the diode dark current characteristics, the load resistor 48, to the center tap 51. During this same half cycle, current will flow from the center tap 51 of the secondary winding 34 through the load resistor 48, the photodiode 45 in accordance with the light incident thereon and the diode dark current characteristics, and through the switching diode 54 to the end terminal 53 of the secondary winding 34. Thus, during this half cycle of the carrier frequency voltage, the current through the compensating diode 37 will subtract, in the load resistor 48, from the current through the photodiode 45 thus providing dark current compensation. Since the load resistors 39 and 48 are connected in series between the output terminals 56 and 57, the output of the photomodulator circuit of Fig. 2 is a compensated full wave modulated signal of the carrier input. Fig. 3 indicates this output for three conditions of light.

It should be noted that, throughout this discussion, it has been assumed that the photodiodes 37 and 45 are subjected to the same temperature conditions. Accordingly, in the physical embodiments of the circuit of Fig. 2, these photodiodes should be positioned with respect to one another so as to meet this condition as nearly as practical. In the absence of light on the photodiode 45, the only current which will flow in the load resistors will be due to the photodiode dark currents, and, since these are in opposite directions in the load resistors, an output voltage will result only if there is some difference in these dark currents. If these are equal and if their temperature characteristics are identical, there will be no output voltage at any temperature as long as both photodiodes are subjected to the same temperature. If one of the photodiodes is illuminated, a current will flow through it and the load in an amount determined by its static characteristics, so that an output voltage results. In a properly designed circuit, the amplitude of this voltage will be proportional to the incident light intensity.

While, in accordance with the provisions of the statutes, there have been illustrated and described the best forms of the embodiments of the invention now known, it will be apparent to those skilled in the art that changes may be made in the forms of the apparatus disclosed without departing from the spirit of the invention as set forth in the appended claims and that in some instances certain features of the invention may be used to advantage without a corresponding use of other features.

Having described the present invention, what is claimed as new and for which it is desired to secure by Letters Patent is:

1. In combination, a pair of transformer secondary windings energized with a carrier frequency signal, a first circuit comprising one of said secondary windings, a load resistor, and means to prevent current flow through said load during one half cycle of said carrier frequency signal, a second circuit comprising the other of said secondary windings, a load resistor, and means to prevent current flow through said load during the other half cycle of said carrier frequency signal, and a photodiode and a compensating diode common to both of said circuits, said photodiode being connected so as to modulate the current through said loads in accordance with the light incident thereon and its dark current characteristics, the compensating diode being connected so as to modulate the current through said loads in accordance with its dark current characteristics, the dark current characteristics of said photodiode and said compensating diode being substantially matched.

2. In combination, a pair of equal loads connected in series, means for supplying current to one of said loads for one half cycle of a carrier frequency signal, means for supplying current to the other of said loads during the other half cycle of said carrier frequency signal, a first photodiode common to both of said means and both of said loads for modulating the currents in said loads in accordance with the light incident on said photodiode means, and a second photodiode common to both of said means and both of said loads for subtracting from said light modulated currents a signal in accordance with the dark current of said photodiodes, the output from said combination being taken across said series connected loads.

3. An electrical apparatus comprising a pair of photodiodes, one of which is adapted to be exposed to a light source, a pair of power sources, a pair of load devices, means including one of said load devices connecting one of said power sources to both of said photodiodes so that the current flowing through said one load from said photodiodes is in opposition, means including the other of said load devices connecting the other of said power sources to both of said photodiodes so that the current flowing through said other load devices from said photodiodes is in opposition, and an apparatus output circuit comprising said two load devices connected in series.

4. In combination, a first circuit comprising the source of carrier frequency voltage, a load resistor, a pair of asymmetrically conducting devices connected in said circuit in such a manner as to prevent current flow through said resistor during one half cycle of said carrier frequency voltage, and a pair of photodiodes having similar characteristics, the first of said pair of photodiodes being connected in said circuit to restrict current flow through said load in accordance with the quantity of light incident thereon, the second of said pair of photodiodes being connected in said circuit in such a manner that the reverse current flow therethrough subtracts in said resistor from the current flow passed by the other of said pair of photodiodes, a second circuit comprising a source of carrier frequency voltage, a resistor, a pair of asymmetrically conducting devices connected in said circuit to prevent current flow through said resistor on the other half cycle of said carrier frequency voltage, and said pair of photodiodes connected in said first circuit, the first of said pair of photodiodes being connected in said second circuit to restrict flow through said resistor in accordance with the quantity of light incident thereon, the second of said pair of photodiodes being connected in said circuit in such a manner that the reverse current flow therethrough subtracts in said resistor from the current flow passed by the other of said pair of photodiodes, and means connecting the resistor in said first circuit and the resistor in said second circuit in series, the output of said combination being across said series connected resistors.

5. In combination, a first circuit comprising a source of carrier frequency voltage, a load, means to prevent current flow through said load during one half cycle of said carrier frequency voltage, a pair of photodiodes, the first of said pair of photodiodes being connected in said circuit to restrict the current flow through said load in accordance with the quantity of light incident thereon, the second of said pair of photodiodes being a compensating photodiode connected in said circuit in such a manner that the reverse current flow therethrough subtracts in the load from the current flow passed by the other of said pair of photodiodes, a second circuit comprising a source of carrier frequency voltage, a load, means to prevent current flow through said load during the half cycle of said carrier frequency voltage during which said first circuit supplies current to its load, and said pair of photodiodes connected in said first circuit, the first of said pair of photodiodes being connected in said circuit to restrict current flow through said load in accordance with the quantity of light incident thereon, the compensating one of said pair of photodiodes being connected in said circuit in such a manner that the reverse current flow therethrough subtracts in said load from the current flow passed by the other of said pair of photodiodes, and means connecting the loads of each of said circuits in series, the output of said combination being across said series connected loads.

6. In combination, a pair of similar resistors connected in series, means for supplying current to one of said resistors during one half cycle of a carrier frequency signal, means for supplying current to the other of said resistors during the other half cycle of said carrier frequency signal, a pair of photodiodes common to both of said means, one of said photodiodes restricting current flow through said loads in accordance with the light incident thereon, the other of said photodiodes being shielded from light and positioned with respect to the first of said photodiodes in such a manner as to be subjected to the same temperature as said first photodiode for restricting the current flow through said loads in accordance with the dark current of said photodiodes in a compensating manner in accordance with the temperature of said photodiodes, the output of said combination being taken across said series connected loads.

7. In combination, a transformer having a primary winding adapted to be connected to a source of carrier frequency voltage and a pair of center tapped secondary windings, a first circuit comprising one of said secondary windings, a load resistor, and a pair of asymmetrically conducting devices to prevent current flow through said load during one half cycle of said carrier frequency signal, a second circuit comprising the other of said secondary windings, a load resistor, and a pair of asymmetrically conducting devices to prevent current flow through said load during the other half cycle of said carrier frequency signal, a photodiode connected in both of said circuits to modulate the current through said loads in accordance with the light incident thereon and its dark current characteristic, a compensating diode connected in both of said circuits to modulate the current through said loads in accordance with the dark current of said photodiode, and means connecting said loads in series, the output of said combination being across said series connected loads.

8. In combination, a pair of carrier frequency signal sources, a first circuit comprising one of said sources, a load, and means to prevent current from said source from flowing through said load during one half cycle of said carrier frequency signal, a second circuit comprising the other of said sources, a load, and means for preventing current from said source flowing through said load during the other half cycle of said carrier frequency signal, a photodiode connected in both of said circuits to modulate the current through said loads in accordance with the light incident thereon and its diode dark current characteristic, and a compensating diode connected in both of said circuits to modulate the current through said loads in accordance with its diode dark current characteristic, the dark current characteristics of said photodiode and said compensating diode being substantially matched.

References Cited in the file of this patent

UNITED STATES PATENTS

| | | |
|---|---|---|
| 2,219,676 | Barber | Oct. 29, 1940 |
| 2,298,466 | Cooley | Oct. 13, 1942 |
| 2,580,692 | Moe | Jan. 1, 1952 |

FOREIGN PATENTS

| | | |
|---|---|---|
| 482,241 | Great Britain | Mar. 25, 1938 |
| 525,166 | Great Britain | Aug. 22, 1940 |